UNITED STATES PATENT OFFICE.

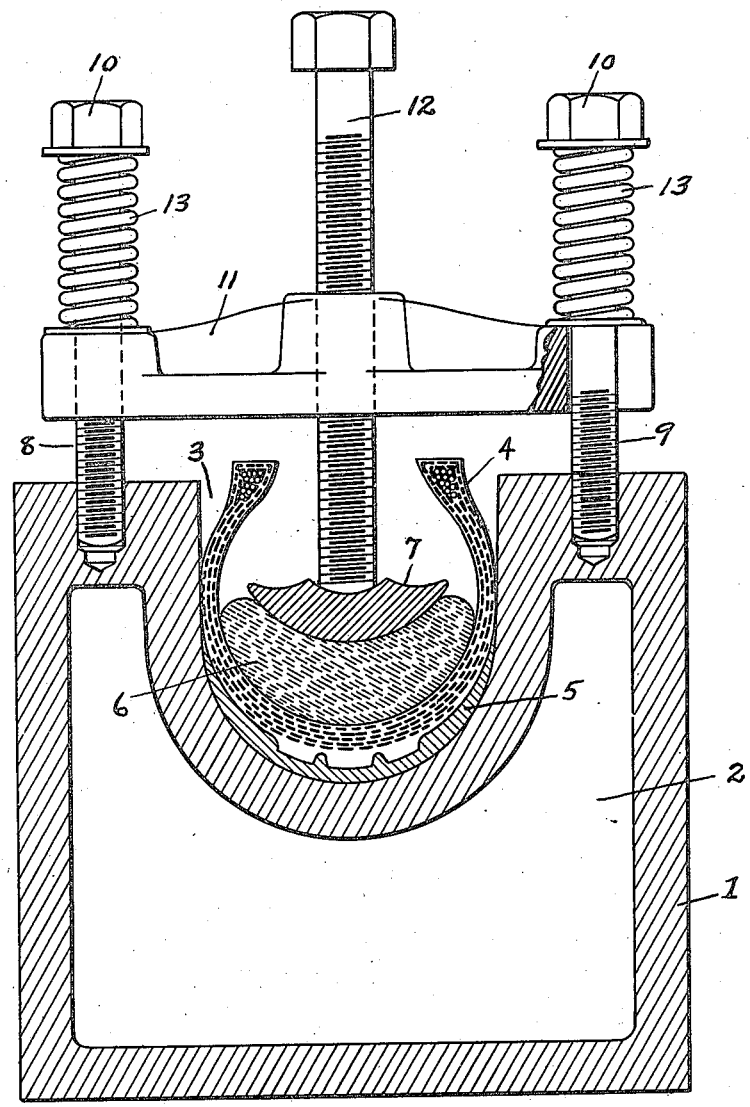

WILLIAM VANDERPOOL, OF SPRINGFIELD, OHIO.

CLAMP FOR VULCANIZING-MOLDS.

1,380,854.　　　　　Specification of Letters Patent.　　Patented June 7, 1921.

Application filed January 17, 1920. Serial No. 352,161.

*To all whom it may concern:*

Be it known that I, WILLIAM VANDERPOOL, a citizen of the United States, residing at Springfield, in the county of Clark and State of Ohio, have invented certain new and useful Improvements in Clamps for Vulcanizing-Molds, of which the following is a specification.

My invention relates to improvements in clamps for vulcanizing molds, particularly molds which are employed for retreading or patching the casings of pneumatic tires.

The object of my invention is to provide a clamp of a character which will permit it to yield to compensate for the flow of the rubber compound during the process of vulcanization or to any movement of the compound within the mold due to contraction or expansion or otherwise.

A further object of my invention is to provide a clamp of the character referred to which will be simple in construction, effective in its operation, and which can be readily applied to the types of vulcanizing molds now in general use for tire repairing.

In the accompanying drawing, the figure represents a vertical section of a mold with a tire therein, showing my improved clamp applied to it.

In the said drawing, 1 represents a vulcanizing mold of a kind in common use for tire repairing, the mold being provided with the usual steam chamber 2 and tire receiving cavity 3. There is shown therein a section of a pneumatic tire casing 4 which has been retracted, 5 representing the tread shell which is usually placed between the tread of the tire and the wall of the cavity 3. 6 is a core in the nature of a sand bag, and 7 the core plate which is placed upon the bag and receives the pressure of the clamps.

In retreading pneumatic tires, particularly where a tread shell is employed which imparts a ribbed or other form of rough tread surface to the tire, it has been found that the rubber compound is slow to enter the interstices of the tread until after the rubber compound has become heated to a certain degree to cause it to flow more freely. With the form of vulcanizing molds and clamping devices now in general use, this frequently results in flaws in the tread for the reason that when the rubber compound flows, the clamping devices, particularly the bag, fail to follow up and maintain a uniform pressure upon the interior of the tire casing. To overcome this difficulty and to also compensate for any expansion or contraction that may take place in the rubber compound during the process of vulcanization, I have devised a clamp of a yielding character so constructed that it may be applied to molds of the type now in general use in a simple and effective manner and which will be effective for the purpose for which it is designed.

In the drawing, but one of these clamps has been shown, but it will be understood that in practice a plurality of the clamps are employed arranged at suitable intervals along the mold. Threaded into, or otherwise engaged with, the walls of the mold at points directly opposite each other are two posts 8 and 9, having heads 10 to receive a wrench or other tool. Straddling each of these posts is the bifurcated end of a cross-bar 11 and between the ends of this cross-bar and the heads 10 are placed coil springs 13. Threaded in the cross-bar 11 is a screw 12 having a head of suitable form to receive a wrench or other tool for the purpose of tightening the screw against the core plate 7. As the screw 12 is tightened to position the cross-bar 11 will be caused to ride upwardly thereon and compress the springs 13 so that the tension of the springs will apply a yielding pressure upon the screw 12 through the cross-bar, and hence a yielding pressure upon the cores and the tire to cause the parts to settle or follow up the tread as it runs or contracts or to relieve any expansion thereof.

By the use of a clamp of this character, the same result can be secured as when the more expensive air bag is used as a core, and a uniform tread free from flaws is insured and also a better union between the tread and fabric.

Having thus described my invention, I claim:—

1. In a clamp of the character described, the combination of a vulcanizing mold, a pair of posts having an engagement with the walls of said mold at points opposite each other, a cross-bar loosely mounted on said posts, springs between said cross-bar and abutments on the posts, and a clamping screw threaded in said cross-bar.

2. In a device of the character described, a vulcanizing mold having a tire-receiving cavity, and a non-compressible core for the tire, of a pair of posts having an engagement with the walls of said mold at points opposite each other, a cross-bar loosely mounted on the posts, springs between the cross-bar and abutments on the posts, and a screw threaded in the cross-bar arranged to apply pressure upon said core and also tension to the springs.

3. In a device of the character described, the combination of a vulcanizing mold, a pair of oppositely arranged posts carried by said mold, a cross-bar loosely mounted on said posts, a clamping screw threaded in said cross-bar, and means for applying spring-pressure to said cross-bar.

4. In a device of the character described, the combination with a vulcanizing mold having a tire receiving cavity and a core for the tire, of a pair of oppositely arranged posts carried by said mold, a cross-bar loosely mounted on said posts, a clamping screw threaded in said cross-bar and extending to said core, and means for applying spring-pressure to said cross-bar.

In testimony whereof, I have hereunto set my hand this 8th day of January, 1920.

WILLIAM VANDERPOOL.

Witness:
   CHAS. I. WELCH.